(12) United States Patent
Yang

(10) Patent No.: US 11,546,782 B2
(45) Date of Patent: Jan. 3, 2023

(54) RADIO LINK MONITORING METHOD, RADIO LINK MONITORING CONFIGURATION METHOD, USER EQUIPMENT AND NETWORK DEVICE

(71) Applicant: VIVO MOBILE COMMUNICATION CO., LTD., Guangdong (CN)

(72) Inventor: Xiaodong Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 90 days.

(21) Appl. No.: 16/636,631

(22) PCT Filed: Jul. 25, 2018

(86) PCT No.: PCT/CN2018/097028
§ 371 (c)(1),
(2) Date: Feb. 4, 2020

(87) PCT Pub. No.: WO2019/029364
PCT Pub. Date: Feb. 14, 2019

(65) Prior Publication Data
US 2020/0382976 A1    Dec. 3, 2020

(30) Foreign Application Priority Data
Aug. 7, 2017 (CN) .......................... 201710667164.3

(51) Int. Cl.
*H04W 24/08*    (2009.01)
*H04L 5/00*    (2006.01)
(Continued)

(52) U.S. Cl.
CPC ........... *H04W 24/08* (2013.01); *H04L 5/0048* (2013.01); *H04W 76/18* (2018.02); *H04W 76/19* (2018.02)

(58) Field of Classification Search
None
See application file for complete search history.

(56) References Cited

U.S. PATENT DOCUMENTS 9,252,930 B2    2/2016  Qu et al.
10,827,426 B2 *  11/2020  Yilmaz .................. H04W 76/28
(Continued)

FOREIGN PATENT DOCUMENTS

CN    102740447 A    10/2012
CN    103384382 A    11/2013
(Continued)

OTHER PUBLICATIONS

European Search Report in Application No. 18844465.7 dated Jul. 15, 2020.
(Continued)

*Primary Examiner* — Steve R Young
(74) *Attorney, Agent, or Firm* — Maschoff Brennan

(57) ABSTRACT

A radio link monitoring method, a radio link monitoring configuration method, a UE and a network device are provided. The radio link monitoring method for the UE includes: receiving configuration information of a reference signal for a radio link monitoring operation, wherein the configuration information comprises configured reference signal or reconfigured reference signal, and/or, radio link monitoring parameter of the configured reference signal reference signal or radio link monitoring parameter of the reconfigured reference signal; and performing the radio link monitoring operation in accordance with the configuration information.

8 Claims, 8 Drawing Sheets

(51) Int. Cl.
*H04W 76/18* (2018.01)
*H04W 76/19* (2018.01)

(56) References Cited

U.S. PATENT DOCUMENTS

| | | | |
|---|---|---|---|
| 2013/0301434 A1 | 11/2013 | Krishnamurthy et al. | |
| 2014/0043988 A1 | 2/2014 | Chen et al. | |
| 2015/0282036 A1* | 10/2015 | Yi | H04L 5/0048 370/332 |
| 2015/0296487 A1* | 10/2015 | Takeda | H04L 5/0048 370/329 |
| 2016/0192269 A1* | 6/2016 | Kim | H04W 36/0072 370/332 |
| 2017/0223561 A1* | 8/2017 | Radulescu | H04W 48/10 |
| 2018/0007574 A1* | 1/2018 | Park | H04W 72/042 |
| 2018/0054290 A1 | 2/2018 | Park et al. | |
| 2018/0115357 A1 | 4/2018 | Park et al. | |
| 2018/0262937 A1* | 9/2018 | Lee | H04B 17/336 |
| 2018/0269950 A1* | 9/2018 | John Wilson et al. | H04B 7/0626 |
| 2019/0190673 A1* | 6/2019 | Kwak | H04B 7/0421 |
| 2020/0037332 A1* | 1/2020 | da Silva | H04W 76/18 |
| 2020/0059397 A1* | 2/2020 | da Silva | H04B 7/0619 |
| 2020/0154326 A1* | 5/2020 | Deenoo | H04W 24/08 |
| 2020/0336973 A1* | 10/2020 | Niu | H04W 72/1289 |

FOREIGN PATENT DOCUMENTS

| | | |
|---|---|---|
| CN | 106688190 A | 5/2017 |
| WO | 2013/051864 A1 | 4/2013 |
| WO | 2013/110329 A1 | 8/2013 |
| WO | 2013/116172 A1 | 8/2013 |
| WO | 2016/122232 A1 | 8/2016 |
| WO | 2016/163842 A1 | 10/2016 |

OTHER PUBLICATIONS

CN Office Action in Application No. 201710667164.3 dated Jun. 28, 2020.
"Reference Signal Design for NR Beam Management" 3GPP TSG RAN WG1 Meeting #87, Oct. 10, 2016.
"CR on CSI-RS resource activation" 3GPP TSG RAN WG1 Meeting #88bis, Apr. 3, 2017.
"NR Radio Link Monitoring", 3GPP TSG RAN WG1 #89, May 15, 2017.
"Remaining issues on NR CIS-RS", 3GPP TSG RAN WG1 Meeting #89, May 15, 2017.
"Usage of RS for radio link monitoring in connected", 3GPP TSG RAN WG1#89, May 15, 2017.
"Discussion on beam failure recovery", 3GPP TSG RAN WG1 NR Ad-Hoc#2, Jun. 27, 2017.
"Remaining issues for RLM", 3GPP TSG RAN WG1 Meeting #91, Nov. 27, 2017.
"Consideration on the mobility without RRC involvement", 3GPP TSG-RAN WG2 Meeting #97bis, Apr. 3, 2017.
"RLM / RLF in NR", 3GPP TSG-RAN WG2 Meeting #99, Aug. 21, 2017.
"Status Report to TSG", 3GPP TSG RAN meeting #75, Mar. 6, 2017.
Written Opinion and International Search Report in Application No. PCT/CN2018/097028 dated Feb. 20, 2020.
3rd Generation Partnership Project, "Technical Specification Group Radio Access Network; Study on New Radio (NR) access technology (Release 14)," 3GPP TR 38.912, vol. 14.1.0, pp. 1-74 (Aug. 3, 2017).
EP Office Action dated May 4, 2022 as received in Application No. 18844465.7.

* cited by examiner

RADIO LINK MONITORING METHOD, RADIO LINK MONITORING CONFIGURATION METHOD, USER EQUIPMENT AND NETWORK DEVICE

CROSS-REFERENCE TO RELATED APPLICATION

The present application is the U.S. national phase of PCT Application No. PCT/CN2018/097028 filed on Jul. 25, 2018, which claims a priority of the Chinese patent application No. 201710667164.3 filed in China on Aug. 7, 2017, which are incorporated herein by reference in their entireties.

TECHNICAL FIELD

The present disclosure relates to the field of communication technology, in particular to a radio link monitoring method, a radio link monitoring configuration method, a User Equipment (UE), and a network device.

BACKGROUND

For a Long Term Evolution (LTE) or a New Radio (NR) system, a Radio Link Monitoring (RLM) function is provided. For the RLM function of the LTE system, a radio link is monitored by a UE through measuring Signal to Interference plus Noise Ratios (SINRs) of parts of Cell-specific Reference Signals (CRSs) for a Physical Downlink Control Channel (PDCCH).

When the measured parts of the CRSs for the PDCCH are each smaller than a predetermined threshold, it means that the radio link is in an out-of-sync state, and at this time a physical layer may transmit an out-of-sync indication to a high layer (a Radio Resource Control (RRC) layer). When N consecutive out-of-sync indications have been received by the RRC layer, the UE may start a radio link failure timer (timer T1).

When the measured parts of the CRSs for the PDCCH are each greater than another threshold, it means that the radio link is in an in-sync state, and at this time the physical layer may transmit an in-sync indication to the high layer (the RRC layer). When M consecutive in-sync indications have been received by the RRC layer, the UE may stop the timer T1.

When the timer T1 expires, the UE may determine that there is a radio link failure. At this time, a radio link failure event may be triggered, and the UE may re-initiate the establishment of the radio link.

The quantities of the above out-of-sync indications and in-sync indications, i.e., N and M, are configured by a network device, and duration of the timer T1 is also configured by the network device.

Reference signals for the RLM in the NR system may be different from those in the LTE system, and a Channel State Information Reference Signal (CSI-RS) and/or a Synchronization Signal (SS) block may be adopted as the reference signals for the RLM. In this case, the reference signals may not be limited to one type of signal. When the types of the reference signals or relevant configurations of the reference signals change, there is currently no scheme about how to continue the RLM in the related art.

SUMMARY

An object of the present disclosure is to provide a radio link monitoring method, a radio link monitoring configuration method, a UE and a network device.

In a first aspect, the present disclosure provides in some embodiments a radio link monitoring method for a UE, including: receiving configuration information of a reference signal for a radio link monitoring operation, wherein the configuration information comprises configured reference signal or reconfigured reference signal, and/or, radio link monitoring parameter of the configured reference signal reference signal or radio link monitoring parameter of the reconfigured reference signal; and performing the radio link monitoring operation in accordance with the configuration information.

In a second aspect, the present disclosure provides in some embodiments a radio link monitoring configuration method for a network device, including: determining configuration information of a reference signal for a radio link monitoring operation of a UE, wherein the configuration information comprises configured reference signal or reconfigured reference signal, and/or, radio link monitoring parameter of the configured reference signal reference signal or radio link monitoring parameter of the reconfigured reference signal; and transmitting the configuration information to the UE.

In a third aspect, the present disclosure provides in some embodiments a UE, including: a configuration reception module configured to receive configuration information of a reference signal for a radio link monitoring operation, wherein the configuration information comprises configured reference signal or reconfigured reference signal, and/or, radio link monitoring parameter of the configured reference signal reference signal or radio link monitoring parameter of the reconfigured reference signal; and a link monitoring module configured to perform the radio link monitoring operation in accordance with the configuration information.

In a fourth aspect, the present disclosure provides in some embodiments a network device, including: a configuration determination module configured to determine configuration information of a reference signal for a radio link monitoring operation of a UE, wherein the configuration information comprises configured reference signal or reconfigured reference signal, and/or, radio link monitoring parameter of the configured reference signal reference signal or radio link monitoring parameter of the reconfigured reference signal; and a configuration determination module configured to transmit the configuration information to the UE.

In a fifth aspect, the present disclosure provides in some embodiments a radio link monitoring method for a UE, including: receiving configuration information of a reference signal for a radio link monitoring operation, wherein the configuration information comprises indication information indicating two types of reference signals for the radio link monitoring operation; and performing the radio link monitoring operation in accordance with the two types of reference signals indicated in the configuration information.

In a sixth aspect, the present disclosure provides in some embodiments a radio link monitoring configuration method for a network device, including: determining configuration information of a reference signal for a radio link monitoring operation of a UE, wherein the configuration information comprises indication information indicating two types of reference signals for the radio link monitoring operation; and transmitting the configuration information to the UE.

In a seventh aspect, the present disclosure provides in some embodiments a UE, including: a configuration reception module configured to receive configuration information of a reference signal for a radio link monitoring operation, wherein the configuration information comprises indication information indicating two types of reference signals for the radio link monitoring operation; and a link monitoring module configured to perform the radio link monitoring operation in accordance with the two types of reference signals indicated in the configuration information.

In an eighth aspect, the present disclosure provides in some embodiments a network device, including: a configuration determination module configured to determine configuration information of a reference signal for a radio link monitoring operation of a UE, wherein the configuration information comprises indication information indicating two types of reference signals for the radio link monitoring operation; and a configuration transmission module configured to transmit the configuration information to the UE.

In an ninth aspect, the present disclosure provides in some embodiments a radio link monitoring method for a UE, including: receiving a deactivation command for a pre-configured first reference signal when performing a radio link monitoring operation in accordance with the first reference signal; and executing or omitting the deactivation command in accordance with whether the first reference signal is allowed to be deactivated.

In a tenth aspect, the present disclosure provides in some embodiments a radio link monitoring configuration method for a network device, including transmitting a deactivation command for a first type reference signal for a radio link monitoring operation to a UE.

In an eleventh aspect, the present disclosure provides in some embodiments a UE, including: a command reception module configured to receive a deactivation command for a first type reference signal when performing a radio link monitoring operation in accordance with the reference signal of a first type; and a command execution module configured to execute or omit the deactivation command in accordance with a configuration parameter indicating whether the reference signal of a first type is allowed to be deactivated.

In a twelfth aspect, the present disclosure provides in some embodiments a network device, including a command transmission module configured to transmit a deactivation command for a first type reference signal for a radio link monitoring operation to a UE.

In a thirteenth aspect, the present disclosure provides in some embodiments a UE, including a memory, a processor, and a computer program stored in the memory and executed by the processor. The processor is configured to execute the computer program so as to implement the above-mentioned radio link monitoring method.

In a fourteenth aspect, the present disclosure provides in some embodiments a computer-readable storage medium storing therein a computer program. The computer program is executed by a processor so as to implement the above-mentioned radio link monitoring method.

In a fifteenth aspect, the present disclosure provides in some embodiments a network device, including a memory, a processor, and a computer program stored in the memory and executed by the processor. The processor is configured to execute the computer program so as to implement the above-mentioned radio link monitoring method for the UE.

In a sixteenth aspect, the present disclosure provides in some embodiments a computer-readable storage medium storing therein a computer program. The computer program is executed by a processor so as to implement the above-mentioned radio link monitoring method for the network device.

BRIEF DESCRIPTION OF THE DRAWINGS

In order to illustrate the technical solutions of some embodiments of the present disclosure in a clearer manner, the drawings desired for some embodiments of the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described in details hereinafter in conjunction with the drawings and embodiments. In the following description, specific details of configurations and assemblies are merely provided to facilitate the understanding of the present disclosure. It should be appreciated that, a person skilled in the art may make further modifications and alternations without departing from the spirit and the scope of the present disclosure. In addition, for clarification and brevity, any known function and structure will not be described hereinafter.

It should be further appreciated that, such phrases as "one embodiment" and "one of the embodiments" intend to indicate that the features, structures or characteristics are contained in at least one embodiment of the present disclosure, rather than necessarily referring to a same embodiment. In addition, the features, structures or characteristics may be combined in any embodiment or embodiments in an appropriate manner.

It should be appreciated that, the following serial numbers do not refer to the order of the steps. Actually, the order shall be determined in accordance with functions and internal logic of the steps, but shall not be construed as limiting the implementation of the embodiment in any form.

A mobile communication system may support various reference signals for a radio link monitoring operation. For example, an LTE system or an NR system may support the radio link monitoring operation using a CSI-RS and an SS block as the reference signals. In this scenario, the types of the reference signals and relevant configurations of the reference signals may change. With respect to this scenario, an object of the present disclosure is to provide a scheme for performing the radio link monitoring operation in the case that various reference signals are supported by a network.

Figure 1:
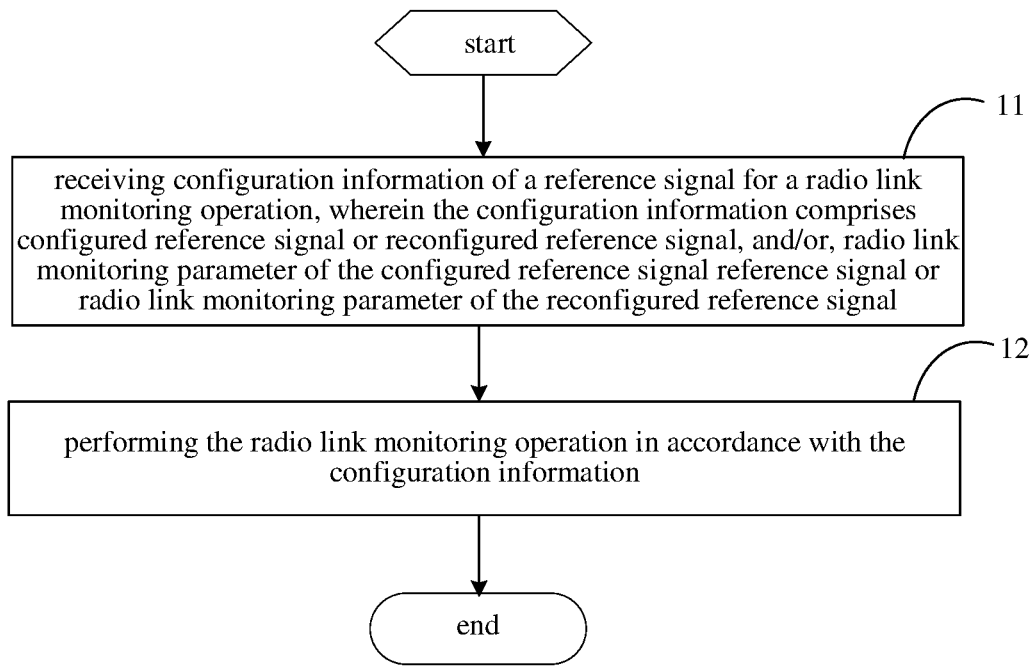
FIG. 1 is a first flow chart of a radio link monitoring method according to some embodiments of the present disclosure.

As shown in FIG. 1, the present disclosure provides in some embodiments a radio link monitoring method for a UE, including Steps 11 and 12.

Step 11: receiving configuration information of a reference signal for a radio link monitoring operation, wherein the configuration information comprises configured reference signal or reconfigured reference signal, and/or, radio link monitoring parameter of the configured reference signal reference signal or radio link monitoring parameter of the reconfigured reference signal.

Here, the UE may receive the configuration information of the reference signal for the radio link monitoring operation from a network device. The network device may be a base station, e.g., a gNB in the NR system, or an eNB in the LTE system. The configuration information may include indication information for configuring or reconfiguring the reference signal for the radio link monitoring operation, or indication information for configuring or reconfiguring the radio link monitoring parameter of the reference signal, or indication information for configuring the reference signal for the radio link monitoring operation and the radio link monitoring parameter, or indication information for reconfiguring the reference signal for the radio link monitoring operation and the radio link monitoring parameter. Here, the radio link monitoring parameter of the reference signal may be such parameters as respective thresholds corresponding to a radio link in-sync counter, a radio link out-of-sync counter and a radio link failure timer.

Here, the configuring the reference signal may include configuring the types of the reference signals. The configuring the radio link monitoring parameter of the reference signal may include configuring the respective thresholds corresponding to the radio link in-sync counter, the radio link out-of-sync counter and the radio link failure timer. The reconfigured reference signal may include a second reference signal for changing a first reference signal of a first type reference signals into the second reference signal of the first type reference signals (e.g., changing a CSI-RS 1 into a CSI-RS 2), or a third reference signal for changing the first reference signal of the first type reference signals into the third reference signal of the second type reference signals. For example, the CSI-RS 1 may be reconfigured into an SS block 1, or the SS block 1 may be reconfigured into the CSI-RS 1. The radio link monitoring parameter of the reconfigured reference signal may include at least one of the reconfigured thresholds corresponding to the radio link in-sync counter, the radio link out-of-sync counter and the radio link failure timer. For example, a timeout value of the timer T1, or a value of N or M, may be reconfigured.

Step 12: performing the radio link monitoring operation in accordance with the configuration information.

Here, the UE may perform the radio link monitoring operation in accordance with the configuration information from the network device. For example, when the configuration information indicates a specific reference signal and/or a specific radio link monitoring parameter, the UE may perform the radio link monitoring operation in accordance with the corresponding reference signal and/or the corresponding radio link monitoring parameter.

Through the above steps, it is able to perform the radio link monitoring operation in the case that various reference signals are supported by the network. During a monitoring procedure, the network device may reconfigure a configuration of the reference signal, e.g., reconfigure the type or the radio link monitoring parameter of the reference signal. The UE may continue to perform the radio link monitoring operation in accordance with the reconfigured reference signal or radio link monitoring parameter of the reconfigured reference signal.

For ease of description, the radio link in-sync counter, the radio link out-of-sync counter and the radio link failure timer may be collectively called as counting units for the radio link monitoring operation.

In some embodiments of the present disclosure, when the configuration information in Step 11 includes the indication information indicating that the reference signal and/or the radio link monitoring parameter of the reference signal are to be reconfigured, in Step 12, during the radio link monitoring operation in accordance with the configuration information, when the counting units for the radio link monitoring operation have been started upon the receipt of the configuration information, all of or parts of the enabled counting units may be maintained or reset, and then the radio link monitoring operation may be performed in accordance with the reconfigured reference signal and/or radio link monitoring parameter of the reconfigured reference signal.

For example, when the reference signal is reconfigured from the CSI-RS into the SS block, the UE may reset parts of or all of the currently-enabled counting units, i.e., reset a count value/time measurement value as 0, and then perform the relevant counting or time measurement processing in accordance with the new reference signal. An example of a counting or time measurement mode will be described as follows. When measured parts of the SS blocks for a PDCCH are each smaller than a predetermined threshold, it means that a radio link is in an out-of-sync state, and at this time a physical layer may transmit an out-of-sync indication to a high layer (an RRC layer). Upon the receipt of the out-of-sync indication by the RRC layer, the count value of the radio link out-of-sync counter may be increased by 1, and the count value of the radio link in-sync counter may be reset. When N consecutive out-of-sync indications have been received by the RRC layer, the UE may start a radio link failure timer T.

When the measured parts of the SS blocks for the PDCCH are each greater than another threshold, it means that the radio link is in an in-sync state, and at this time the physical layer may transmit an in-sync indication to the high layer (the RRC layer). Upon the receipt of the in-sync indication by the RRC layer, the count value of the radio link in-sync counter may be increased by 1, and the count value of the radio link out-of-sync may be reset to 0. When M consecutive in-sync indications have been received by the RRC layer, the UE may stop the timer T1.

When the timer T1 expires, the UE may determine that there is a radio link failure. At this time, a radio link failure event may be triggered, and the UE may re-initiate the establishment of the radio link.

Figure 2:
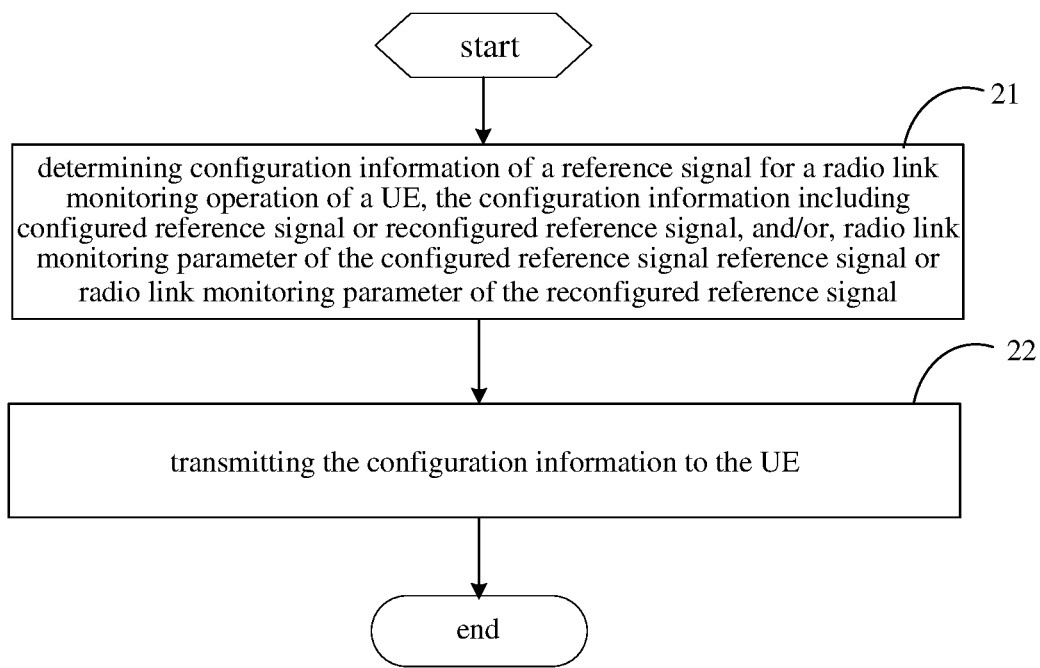
FIG. 2 is a first flow chart of a radio link monitoring configuration method according to some embodiments of the present disclosure.

With respect to the radio link monitoring method in FIG. 1, as shown in FIG. 2, the present disclosure further provides in some embodiments a radio link monitoring configuration method for a network device. The network device may be a base station, e.g., a gNB in an NR system or an eNB in an LTE system. As shown in FIG. 2, the radio link monitoring configuration method includes Steps 21 and 22.

Step 21: determining configuration information of a reference signal for a radio link monitoring operation of a UE, the configuration information including configured reference signal or reconfigured reference signal, and/or, radio link monitoring parameter of the configured reference signal reference signal or radio link monitoring parameter of the reconfigured reference signal.

Here, the configuring the reference signal may include configuring the types of the reference signals. The configuring the radio link monitoring parameter of the reference signal may include configuring the thresholds corresponding to the radio link in-sync counter, the radio link out-of-sync counter and the radio link failure timer. The reconfigured reference signal may include a second reference signal for changing a first reference signal of a first type reference signals into the second reference signal of the first type reference signals, or a third reference signal for changing the first reference signal of the first type reference signals into the third reference signal of the second type reference signals. The radio link monitoring parameter of the reconfigured reference signal may include at least one of reconfigured thresholds corresponding to the radio link in-sync counter, the radio link out-of-sync counter and the radio link failure timer.

Step 22: transmitting the configuration information to the UE.

The network device may transmit the configuration information to the UE, so that the UE may perform the radio link monitoring operation in accordance with the configuration information.

Figure 3:
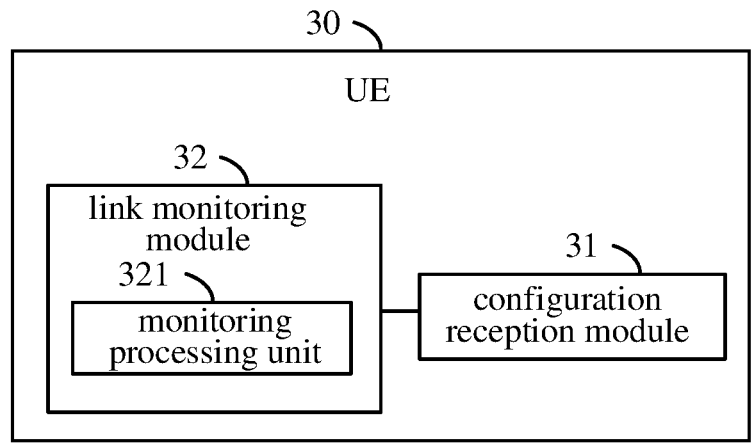
FIG. 3 is a first schematic view showing a UE according to some embodiments of the present disclosure.

Based on the above method, the present disclosure further provides in some embodiments a UE 30 which, as shown in FIG. 3, includes: a configuration reception module 31 configured to receive configuration information of a reference signal for a radio link monitoring operation, the configuration information including configured reference signal or reconfigured reference signal, and/or, radio link monitoring parameter of the configured reference signal reference signal or radio link monitoring parameter of the reconfigured reference signal; and a link monitoring module 32 configured to perform the radio link monitoring operation in accordance with the configuration information.

Here, the link monitoring module 32 may include a monitoring processing unit 321 configured to, when the configuration information includes the configured reference signal and/or the radio link monitoring parameter of the reconfigured reference signal has been received, maintain or reset all of or parts of enabled counting units, and perform the radio link monitoring operation in accordance with the reconfigured reference signal and/or the radio link monitoring parameter of the reconfigured reference signal. The counting units may include a radio link in-sync counter, a radio link out-of-sync counter and a radio link failure timer.

Figure 4:
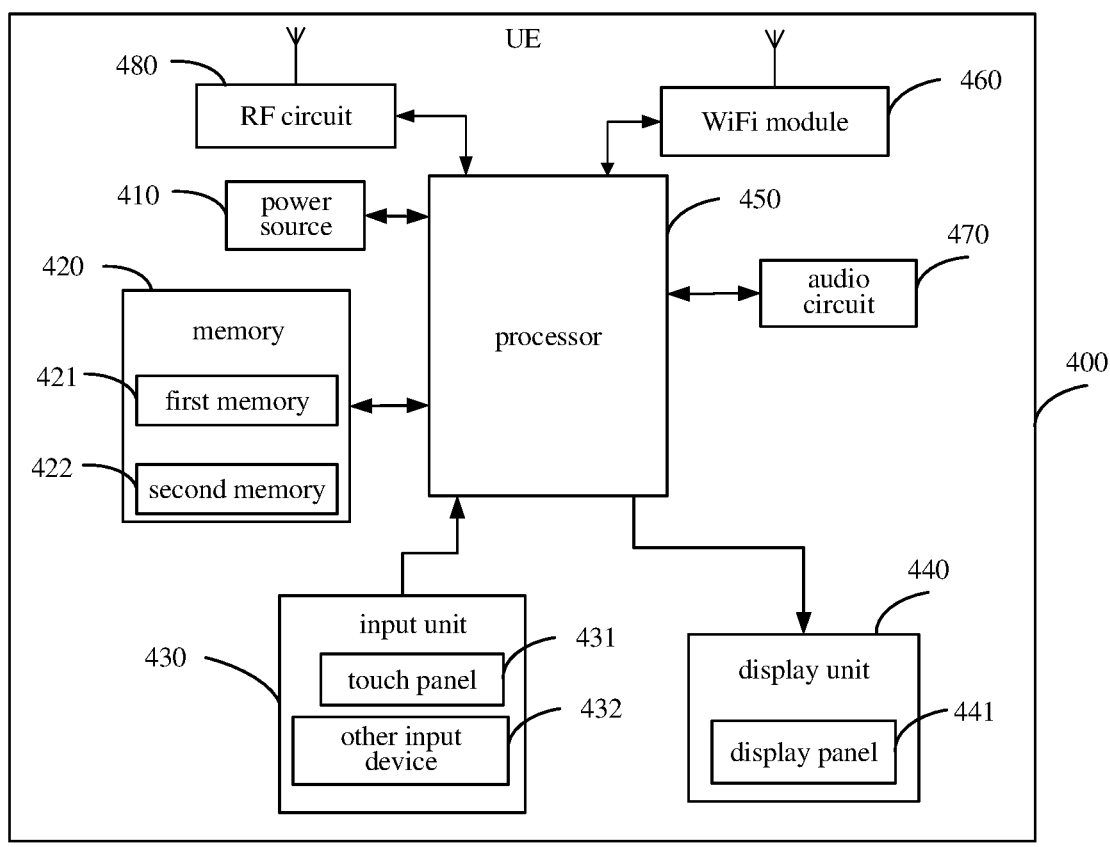
FIG. 4 is a second schematic view showing the UE according to some embodiments of the present disclosure.

As shown in FIG. 4, the present disclosure further provides in some embodiments a UE 400. The UE 400 may be a mobile phone, a flat-panel computer, a Personal Digital Assistant (PDA), or a vehicle-mounted computer.

The UE 400 of FIG. 4 may include a power source 410, a memory 420, an input unit 430, a display unit 440, a processor 450, a Wireless Fidelity (WiFi) module 460, an audio circuit 470, and a Radio Frequency (RF) circuit 480.

The input unit 430 is configured to receive information inputted by a user, and generate a signal input related to user settings and function control of the UE 400. To be specific, in some embodiments of the present disclosure, the input unit 430 may include a touch panel 431, also called as touch screen, which is configured to collect a touch operation made by the user on or in proximity to the touch panel (e.g., an operation made by the user through any appropriate object or attachment (e.g., finger or stylus) on or in the proximity to the touch panel 431), and drive a corresponding connection device in accordance with a predetermined program. In a possible embodiment of the present disclosure, the touch panel 431 may include a touch detection device and a touch controller. The touch detection device is configured to detect a touch position of a user and a signal generated due to the touch operation, and transmit the signal to the touch controller. The touch controller is configured to receive touch information from the touch detection device, convert it into coordinates of a touch point, transmit the coordinates to the processor 450, and receive and execute a command from the processor 450. In addition, the touch panel 431 may be of a resistive type, a capacitive type, an infrared type or a Surface Acoustic Wave (SAW) type. The input unit 430 may further include another input device 432 which includes, but not limited to, one or more of a physical keyboard, a functional button (e.g., a volume control button or an on/off button), a trackball, a mouse, and a joystick.

The display unit 440 is configured to display information inputted by the user or information to be presented to the user, and various interfaces for the UE, and it may include a display panel 441. In a possible embodiment of the present disclosure, the display panel 441 may be a Liquid Crystal Display (LCD) panel or an Organic Light-Emitting Diode (OLED) panel.

It should be appreciated that, the touch panel 431 may cover the display panel 441, so as to form a touch display panel. When the touch operation made on or in proximity to the touch display panel has been detected, the touch information may be transmitted to the processor 450 so as to determine a type of a touch event. Then, the processor 450 may provide corresponding visual output on the touch display panel in accordance with the type of the touch event.

The touch display panel may include an application interface display region and a commonly-used controls display region. An arrangement mode of the two display regions will not be particularly defined herein, e.g., one of the two display regions may be arranged above or under the other, or arranged to the left or the right of the other, so as to distinguish the two display regions from each other. The application interface display region may be adopted to display interfaces for applications, and each interface may include an icon for at least one application and/or an interface element such as Widget desktop control. The application interface display region may also be a blank interface where no content is contained. The commonly-used controls display region may be adopted to display controls which are used frequently, e.g., setting button, interface number, scroll bar, or such application icons as telephone book icon.

The processor 450 is a control center of the UE, and connected to each member of the entire UE via various interfaces and lines. The processor 450 is configured to run or execute software programs and/or modules stored in a first memory 421, and call data stored in a second memory 422, so as to achieve various functions of the UE and process the data, thereby to monitor the UE. In a possible embodiment of the present disclosure, the processor 450 may include one or more processing units.

In some embodiments of the present disclosure, the processor 450 is configured to call the software programs and/or modules in the first memory 421 and/or the data in the second memory 422, so as to: receive configuration information of a reference signal for a radio link monitoring operation, the configuration information including configured reference signal or reconfigured reference signal, and/or, radio link monitoring parameter of the configured reference signal reference signal or radio link monitoring parameter of the reconfigured reference signal; and perform the radio link monitoring operation in accordance with the configuration information.

To be specific, the processor 450 is further configured to execute the computer program so as to, when the configuration information has been received, maintain or reset all of or parts of enabled counting units, and perform the radio link monitoring operation in accordance with the reconfigured reference signal and/or the radio link monitoring parameter of the reconfigured reference signal. The counting units may include a radio link in-sync counter, a radio link out-of-sync counter and a radio link failure timer.

Here, the reconfigured reference signal may include a second reference signal for changing a first reference signal of a first type reference signals into the second reference signal of the first type reference signals, or a third reference signal for changing the first reference signal of the first type reference signals into the third reference signal of the second type reference signals. The radio link monitoring parameter of the reconfigured reference signal may include at least one of reconfigured thresholds corresponding to the radio link in-sync counter, the radio link out-of-sync counter and the radio link failure timer.

Figure 5:
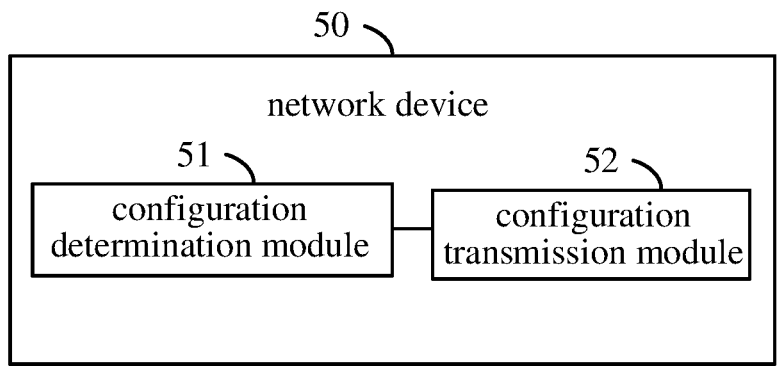
FIG. 5 is a schematic view showing a network device according to some embodiments of the present disclosure.

As shown in FIG. 5, the present disclosure further provides in some embodiments a network device 50, and the network device may be a base station. The network device 50 includes: a configuration determination module 51 configured to determine configuration information of a reference signal for a radio link monitoring operation of a UE, the configuration information including configured reference signal or reconfigured reference signal, and/or, radio link monitoring parameter of the configured reference signal reference signal or radio link monitoring parameter of the reconfigured reference signal; and a configuration transmission module 52 configured to transmit the configuration information to the UE.

Figure 6:
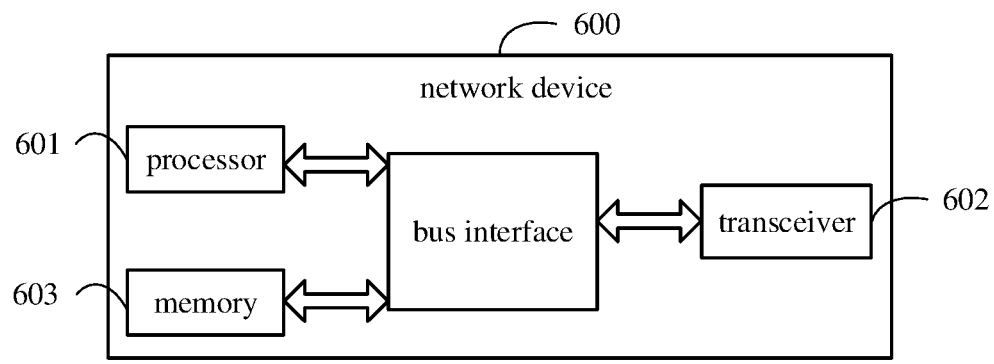
FIG. 6 is a second schematic view showing the network device according to some embodiments of the present disclosure.

As shown in FIG. 6, the present disclosure further provides in some embodiments a network device 600 capable of implementing the above-mentioned radio link monitoring configuration method for the network device with a same technical effect. The network device 600 includes a processor 601, a transceiver 602, a memory 603, and a bus interface. The processor 601 is configured to read a program stored in the memory 603, so as to: determine configuration information of a reference signal for a radio link monitoring operation of a UE, the configuration information including configured reference signal or reconfigured reference signal, and/or, radio link monitoring parameter of the configured reference signal reference signal or radio link monitoring parameter of the reconfigured reference signal; and transmit the configuration information to the UE.

In FIG. 6, bus architecture may include a number of buses and bridges connected to each other, so as to connect various circuits for one or more processors such as the processor 601 and one or more memories such as the memory 603. In addition, as is known in the art, the bus architecture may be used to connect various other circuits, such as a circuit for a peripheral device, a circuit for a voltage stabilizer and a power management circuit, which are not further described herein. The bus interface may be provided, and the transceiver 602 may consist of a plurality of elements, i.e., a transmitter and a receiver for communication with various other devices over a transmission medium. The processor 601 may take charge of managing the bus architecture as well as general processings. The memory 603 may store therein data for the operation of the processor 601.

In some embodiments of the present disclosure, it is able to support the radio link monitoring operation in accordance with two types of reference signals. To be specific, a set of counting units may be provided for the two types of reference signals, and counters/timers in the same set of counting units may be enabled in accordance with measurement results of the two types of reference signals. In addition, a separate set of counting units may be provided for each type of reference signals, i.e., a counting/time measurement operation may be performed on each type of reference signals separately.

Figure 7:
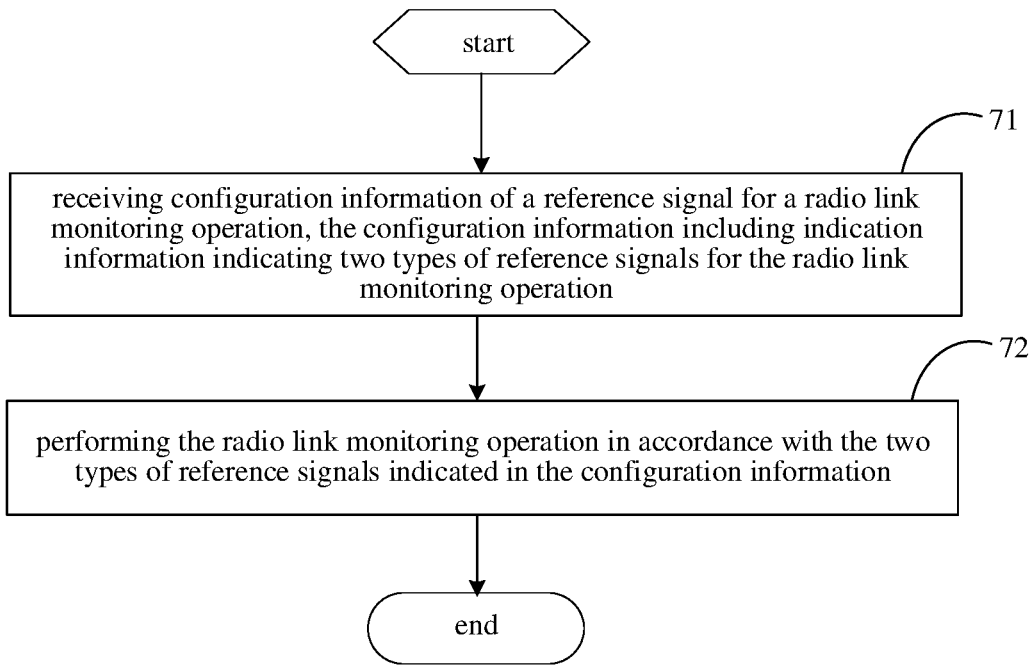
FIG. 7 is a second flow chart of a radio link monitoring method according to some embodiments of the present disclosure.

As shown in FIG. 7, the present disclosure further provides in some embodiments a radio link monitoring method for a UE, which includes Steps 71 and 72.

Step 71: receiving configuration information of a reference signal for a radio link monitoring operation, the configuration information including indication information indicating two types of reference signals for the radio link monitoring operation.

Here, the two types of reference signals may include CSI-RSs and SS blocks, or a combination of other reference signals, e.g., Demodulation Reference Signals (DMRSs).

Step 72: performing the radio link monitoring operation in accordance with the two types of reference signals indicated in the configuration information.

Here, during the radio link monitoring operation in accordance with the two types of reference signals, a set of counting units may be provided for the two types of reference signals, and counters/timers in the same set of counting units may be enabled in accordance with measurement results of the two types of reference signals. In addition, a separate set of counting units may be provided for each type of reference signals, i.e., a counting/time measurement operation may be performed on each type of reference signals separately.

To be specific, when a same set of counting units are provided and one link in-sync indication has been monitored on any type of the two types of reference signals, a count value of a radio link in-sync counter may be increased by 1 (at this time, a radio link out-of-sync counter may be reset to 0). In addition, when the count value of the radio link in-sync counter reaches a first threshold, a radio link failure timer may be reset or stopped. When one link out-of-sync indication has been monitored on any type of the two types of reference signals, the count value of the radio link out-of-sync counter may be increased by 1 (at this time, the radio link in-sync counter may be reset to 0). When the count value of the radio link out-of-sync counter reaches a second threshold, the radio link failure timer may be enabled to measure time.

When two sets of counting units are provided, i.e., when the corresponding radio link in-sync counter, radio link out-of-sync counter and radio link failure timer are provided with respect to each type of reference signals, the radio link in-sync counter or the radio link out-of-sync counter corresponding to each type of reference signals may be enabled in accordance with the link in-sync or out-of-sync indication monitored on each type of reference signals. When the count value of the radio link out-of-sync counter corresponding to any type of reference signals reaches a corresponding threshold or count values of the radio link out-of-sync counters corresponding to the two types of reference signals each reach the corresponding threshold, it means that there is a radio link failure. At this time, a radio link failure event may be triggered, and the UE may re-initiate a radio link establishment process.

Further, when the value of the radio link failure timer corresponding to any type of reference signals reaches the corresponding threshold, the UE may further report to the network device a notification message indicating that there is a radio link failure of the reference signal corresponding to any type of reference signals.

Figure 8:
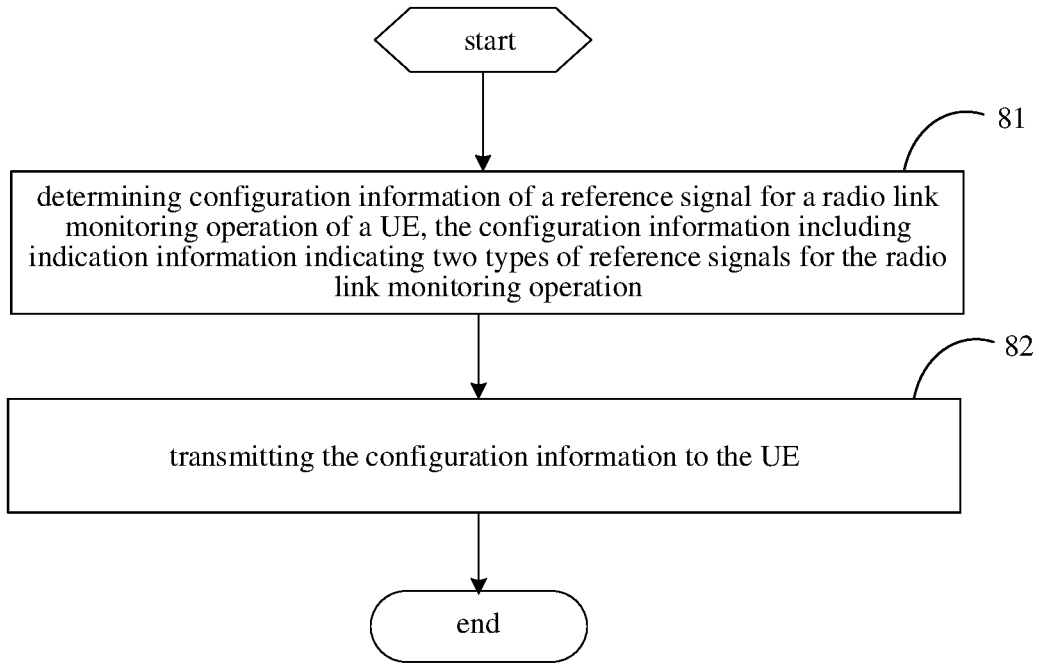
FIG. 8 is a second flow chart of a radio link monitoring configuration method according to some embodiments of the present disclosure.

Based on the above method for the UE, the present disclosure further provides in some embodiments a radio link monitoring configuration method for a network device which, as shown in FIG. 8, includes Steps 81 and 82.

Step 81: determining configuration information of a reference signal for a radio link monitoring operation of a UE, the configuration information including indication information indicating two types of reference signals for the radio link monitoring operation.

Here, the two types of reference signals may include CSI-RSs and SS blocks, or a combination of other reference signals, e.g., DMRSs.

Step 82: transmitting the configuration information to the UE.

The network device may transmit the configuration information including the indication information indicating the two types of reference signals to the UE, so that the UE may perform the radio link monitoring operation in accordance with the two types of reference signals.

Figure 9:
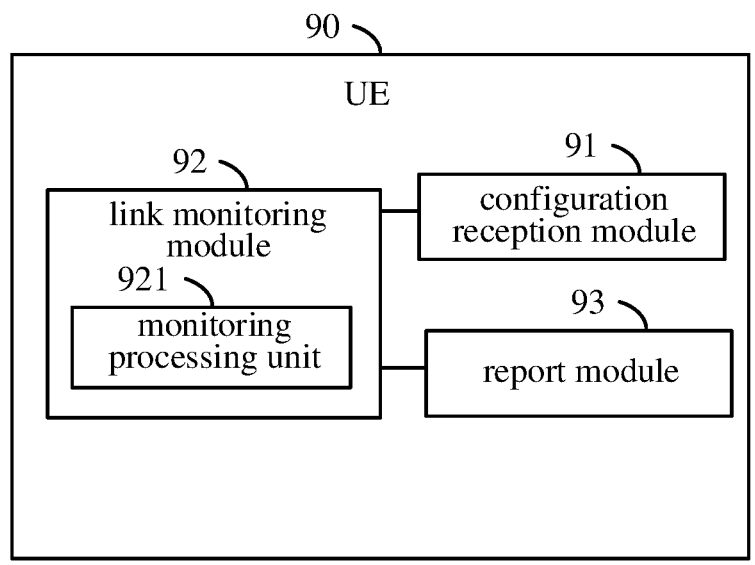
FIG. 9 is a third schematic view showing the UE according to some embodiments of the present disclosure.

Based on the above method, the present disclosure further provides in some embodiments a UE 90 which, as shown in FIG. 9, includes: a configuration reception module 91 configured to receive configuration information of a reference signal for a radio link monitoring operation, the configuration information including indication information indicating two types of reference signals for the radio link monitoring operation; and a link monitoring module 92 configured to perform the radio link monitoring operation in accordance with the two types of reference signals indicated in the configuration information.

In a possible embodiment of the present disclosure, the link monitoring module 92 may include a monitoring processing unit 921 configured to: when one link in-sync indication has been monitored on any type of the two types of reference signals, enable a count value of a radio link in-sync counter to be increased by 1, and when the count value of the radio link in-sync counter reaches a first threshold, reset or stop a radio link failure timer; and when one link out-of-sync indication has been monitored on any type of the two types of reference signals, enable a count value of a radio link out-of-sync counter to be increased by 1, and when the count value of the radio link out-of-sync counter reaches a second threshold, enable the radio link failure timer.

In another possible embodiment of the present disclosure, the link monitoring module 92 may include: a setting unit configured to set a respective radio link in-sync counter, a respective radio link out-of-sync counter and a respective radio link failure timer with respect to each type of reference signals; and a monitoring unit configured to enable the radio link in-sync counter or the radio link out-of-sync counter corresponding to the type of reference signals in accordance with a link in-sync or out-of-sync indication monitored on each type of reference signals, and when a count value of the radio link out-of-sync counter corresponding to any type of reference signals reaches a corresponding threshold or the count values of the radio link out-of-sync counters corresponding to the two types of reference signals each reach the corresponding threshold, determine that there is a radio link failure.

Here, the UE 90 may further include a report module 93 configured to, when the value of the radio link failure timer corresponding to any type of reference signals reaches the corresponding threshold, report to the network device a notification message indicating that there is the radio link failure for the reference signal corresponding to any type of reference signals.

Figure 10:
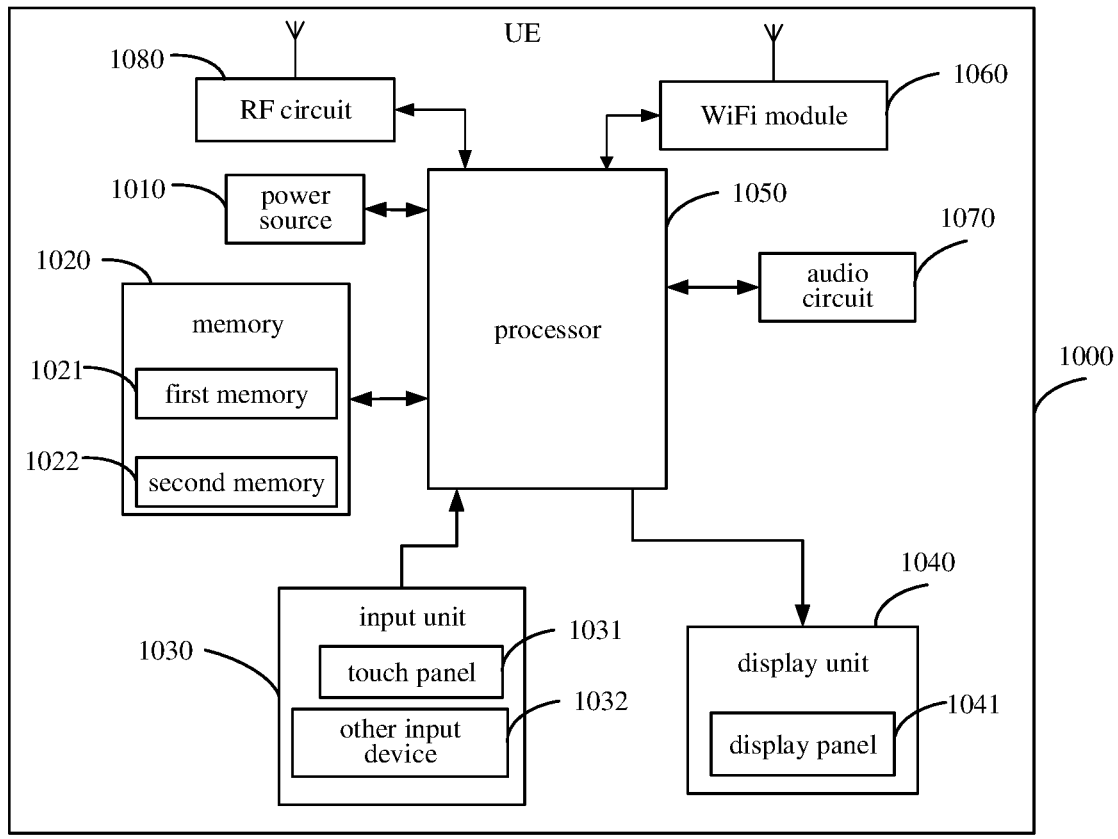
FIG. 10 is a fourth schematic view showing the UE according to some embodiments of the present disclosure.

As shown in FIG. 10, the present disclosure further provides in some embodiments a UE 1000. To be specific, the UE 1000 may be a mobile phone, a flat-panel computer, a PDA, or a vehicle-mounted computer.

The UE 1000 of FIG. 10 may include a power source 1010, a memory 1020, an input unit 1030, a display unit 1040, a processor 1050, a WiFi module 1060, an audio circuit 1070, and an RF circuit 1080.

The input unit 1030 is configured to receive information inputted by a user, and generate a signal input related to user settings and function control of the UE 1000. To be specific, in some embodiments of the present disclosure, the input unit 1030 may include a touch panel 1031, also called as touch screen, which is configured to collect a touch operation made by the user on or in proximity to the touch panel (e.g., an operation made by the user through any appropriate object or attachment (e.g., finger or stylus) on or in the proximity to the touch panel 1031), and drive a corresponding connection device in accordance with a predetermined program. In a possible embodiment of the present disclosure, the touch panel 1031 may include a touch detection device and a touch controller. The touch detection device is configured to detect a touch position of a user and a signal generated due to the touch operation, and transmit the signal to the touch controller. The touch controller is configured to receive touch information from the touch detection device, convert it into coordinates of a touch point, transmit the coordinates to the processor 1050, and receive and execute a command from the processor 1050. In addition, the touch panel 1031 may be of a resistive type, a capacitive type, an infrared type or a SAW type. The input unit 1030 may further include another input device 1032 which includes, but not limited to, one or more of a physical keyboard, a functional button (e.g., a volume control button or an on/off button), a trackball, a mouse, and a joystick.

The display unit 1040 is configured to display information inputted by the user or information to be presented to the user, and various interfaces for the UE, and it may include a display panel 1041. In a possible embodiment of the present disclosure, the display panel 1041 may be an LCD panel or an OLED panel.

It should be appreciated that, the touch panel 1031 may cover the display panel 1041, so as to form a touch display panel. When the touch operation made on or in proximity to the touch display panel has been detected, the touch information may be transmitted to the processor 1050 so as to determine a type of a touch event. Then, the processor 1050 may provide corresponding visual output on the touch display panel in accordance with the type of the touch event.

The touch display panel may include an application interface display region and a commonly-used controls display region. An arrangement mode of the two display regions will not be particularly defined herein, e.g., one of the two display regions may be arranged above or under the other, or arranged to the left or the right of the other, so as to distinguish the two display regions from each other. The application interface display region may be adopted to display interfaces for applications, and each interface may include an icon for at least one application and/or an interface element such as Widget desktop control. The application interface display region may also be a blank interface where no content is contained. The commonly-used controls display region may be adopted to display controls which are used frequently, e.g., setting button, interface number, scroll bar, or such application icons as telephone book icon.

The processor 1050 is a control center of the UE, and connected to each member of the entire UE via various interfaces and lines. The processor 1050 is configured to run or execute software programs and/or modules stored in a first memory 1021, and call data stored in a second memory 1022, so as to achieve various functions of the UE and process the data, thereby to monitor the UE. In a possible embodiment of the present disclosure, the processor 1050 may include one or more processing units.

In some embodiments of the present disclosure, the processor 1050 is configured to call the software programs and/or modules in the first memory 1021 and/or the data in the second memory 1022, so as to: receive configuration information of a reference signal for a radio link monitoring operation, the configuration information including indication information indicating two types of reference signals for the radio link monitoring operation; and perform the radio link monitoring operation in accordance with the two types of reference signals indicated in the configuration information.

In a possible embodiment of the present disclosure, the processor 1050 is further configured to execute the computer program so as to: when one link in-sync indication has been monitored on any type of the two types of reference signals, enable a count value of a radio link in-sync counter to be increased by 1, and when the count value of the radio link in-sync counter reaches a first threshold, reset or stop a radio link failure timer; and when one link out-of-sync indication has been monitored on any type of the two types of reference signals, enable a count value of a radio link out-of-sync counter to be increased by 1, and when the count value of the radio link out-of-sync counter reaches a second threshold, enable the radio link failure timer.

In another possible embodiment of the present disclosure, the processor 1050 is further configured to execute the computer program so as to: set a respective radio link in-sync counter, a respective radio link out-of-sync counter and a respective radio link failure timer with respect to each type of reference signals; and enable the radio link in-sync counter or the radio link out-of-sync counter corresponding to the type of reference signals to measure time in accordance with a link in-sync or out-of-sync indication monitored on each type of reference signals, and when a count value of the radio link out-of-sync counter corresponding to any type of reference signals reaches a corresponding threshold or count values of the two radio link out-of-sync counters corresponding to the two types of reference signals each reach the corresponding threshold, determine that there is a radio link failure.

In a possible embodiment of the present disclosure, the processor 1050 is further configured to execute the computer program so as to report to the network device a notification message indicating that there is the radio link failure for the reference signal corresponding to any type of reference signals.

Figure 11:
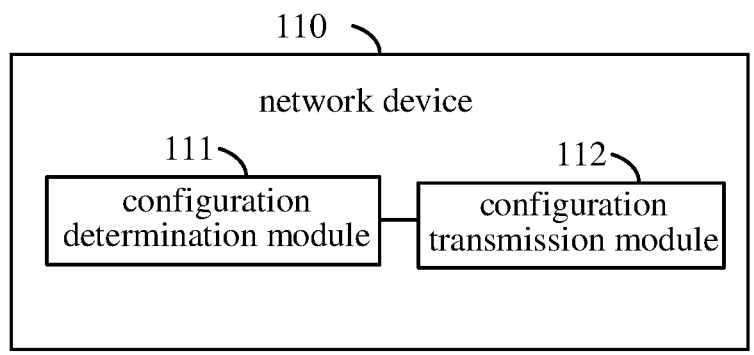
FIG. 11 is a third schematic view showing the network device according to some embodiments of the present disclosure.

The present disclosure further provides in some embodiments a network device 110 which, as shown in FIG. 11, includes: a configuration determination module 111 configured to determine configuration information of a reference signal for a radio link monitoring operation of a UE, the configuration information including indication information indicating two types of reference signals for the radio link monitoring operation; and a configuration transmission module 112 configured to transmit the configuration information to the UE.

Figure 12:
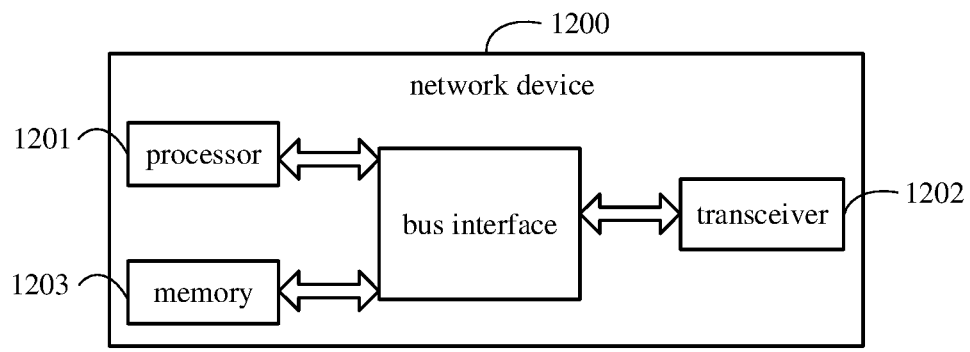
FIG. 12 is a fourth schematic view showing the network device according to some embodiments of the present disclosure.

As shown in FIG. 12, the present disclosure further provides in some embodiments a network device 1200 capable of implementing the radio link monitoring configuration method for the network device with a same technical effect. As shown in FIG. 12, the network device 1200 includes a processor 1201, a transceiver 1202, a memory 1203, and a bus interface. The processor 1201 is configured to read a program stored in the memory 1203, so as to: determine configuration information of a reference signal for a radio link monitoring operation of a UE, the configuration information including indication information indicating two types of reference signals for the radio link monitoring operation; and transmit the configuration information to the UE.

In FIG. 12, bus architecture may include a number of buses and bridges connected to each other, so as to connect various circuits for one or more processors such as the processor 1201 and one or more memories such as the memory 1203. In addition, as is known in the art, the bus architecture may be used to connect various other circuits, such as a circuit for a peripheral device, a circuit for a voltage stabilizer and a power management circuit, which are not further described herein. The bus interface may be provided, and the transceiver 1202 may consist of a plurality of elements, i.e., a transmitter and a receiver for communication with various other devices over a transmission medium. The processor 1201 may take charge of managing the bus architecture as well as general processings. The memory 1203 may store therein data for the operation of the processor 1201.

Figure 13:
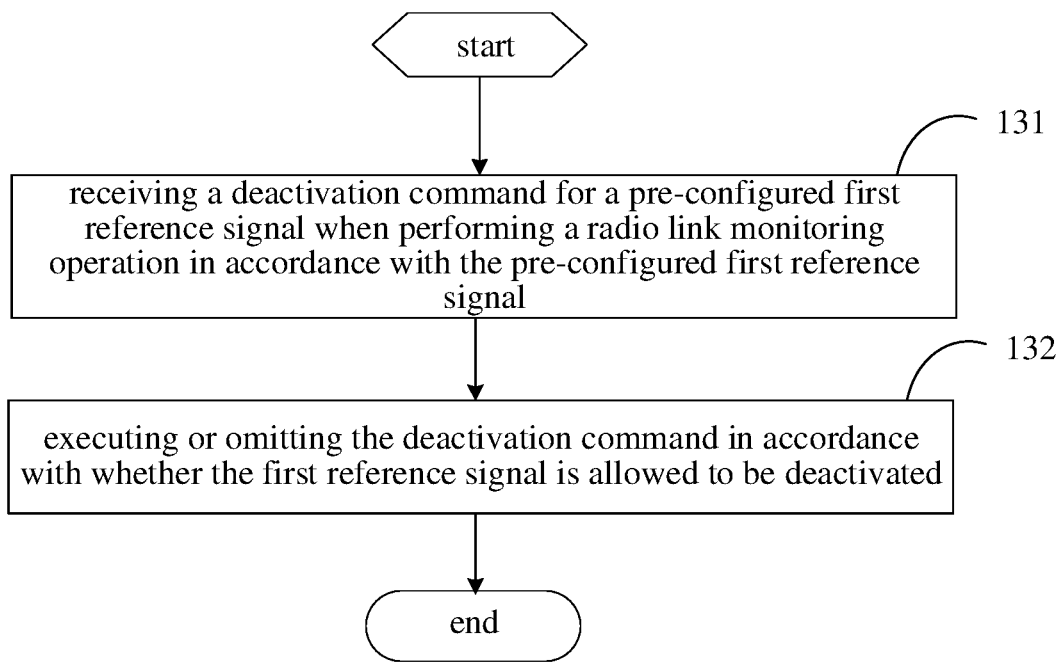
FIG. 13 is a third flow chart of a radio link monitoring method according to some embodiments of the present disclosure.

In actual use, one reference signal may be configured for the UE for the radio link monitoring operation. When the configured reference signal is deactivated, the UE may determine whether or not to switch to perform the radio link monitoring operation on another reference signal. In the above scenario, in Step 11 as shown in FIG. 1, the configuration information may merely include one reference signal, and after Step 12, the UE may receive a deactivation command for the reference signal from the network device. As shown in FIG. 13, the present disclosure further provides in some embodiments a radio link monitoring method for a UE, which includes Steps 131 and 132.

Step 131: receiving a deactivation command for a pre-configured first reference signal when performing a radio link monitoring operation in accordance with the pre-configured first reference signal.

Here, the deactivation command may be transmitted by a network device to the UE, or generated by the UE itself. For example, the UE may receive the deactivation command from the network device via a RRC signaling, a Media Access Control (MAC) signaling or a physical layer signaling. The deactivation command may be a deactivation command with respect to a certain reference signal itself (i.e., used to directly deactivate the reference signal), or a deactivation command with respect to a time-frequency-domain resource corresponding to a certain reference signal, or a deactivation command with respect to a cell corresponding to a certain reference signal.

Step 132: executing or omitting the deactivation command in accordance with whether the first reference signal is allowed to be deactivated.

Here, the UE may execute or omit the deactivation command in accordance with a previously acquired configuration parameter about whether the first reference signal is allowed to be deactivated. The configuration parameter may be predetermined and configured by the UE, or configured by the network device.

To be specific, when the first reference signal is allowed to be deactivated, the UE may switch to perform the radio link monitoring operation on a second reference signal. When the UE switches to perform the radio link monitoring operation on the second reference signal, all of or parts of enabled counting units may be maintained or reset. The counting units may include a radio link in-sync counter, a radio link out-of-sync counter and a radio link failure timer.

When the pre-configured first reference signal is not allowed to be deactivated, the UE may omit the deactivation command, and continue to perform the radio link monitoring operation on the first reference signal.

For example, the first reference signal may be a CSI-RS 1, and the second reference signal may be a CSI-RS 2. The UE may switch from the CSI-RS 1 to the CSI-RS 2 for the radio link monitoring operation in accordance with the deactivation command. For another example, the first reference signal may be the CSI-RS 1 and the second reference signal may be an SS block 1, or the first reference signal may be the SS block 1 and the second reference signal may be an SS block 2. The second reference signal may be configured by the network device in advance, or the UE may search for a reference signal in accordance with a certain criterion, e.g., a reference signal of an SS block on a PDCCH beam which is currently monitored by the UE.

In a possible embodiment of the present disclosure, Steps 131 and 132 may be performed subsequent to Step 12 in FIG. 1.

Figure 14:
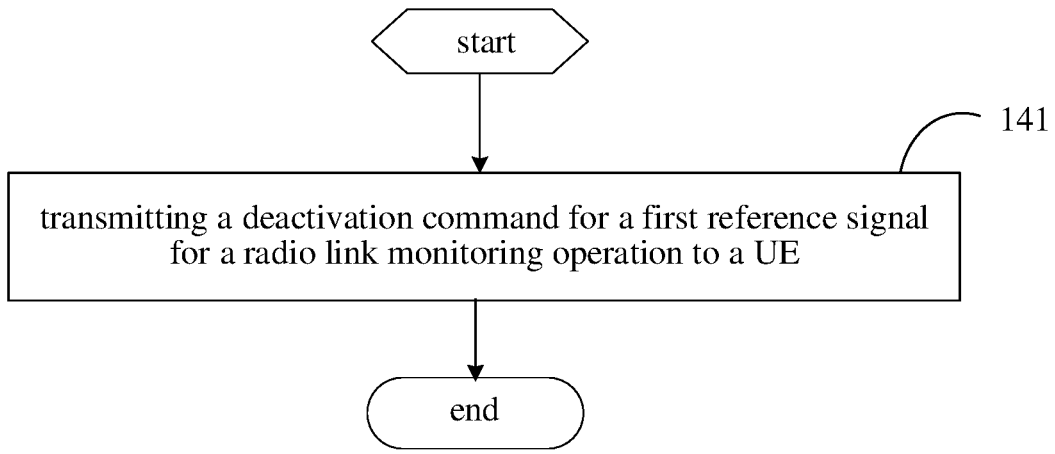
FIG. 14 is a third flow chart of a radio link monitoring configuration method according to some embodiments of the present disclosure.

Based on the above method, the present disclosure further provides in some embodiments a radio link monitoring configuration method for a network device which, as shown in FIG. 14, includes Step 141 of transmitting a deactivation command for a first reference signal for a radio link monitoring operation to a UE.

Here, the deactivation command may be transmitted by the network device to the UE via a RRC signaling, a MAC signaling or a physical layer signaling. The deactivation command may be a deactivation command with respect to a certain reference signal itself (i.e., used to directly deactivate the reference signal), or a deactivation command with respect to a time-frequency-domain resource corresponding to a certain reference signal, or a deactivation command with respect to a cell corresponding to a certain reference signal.

Figure 15:
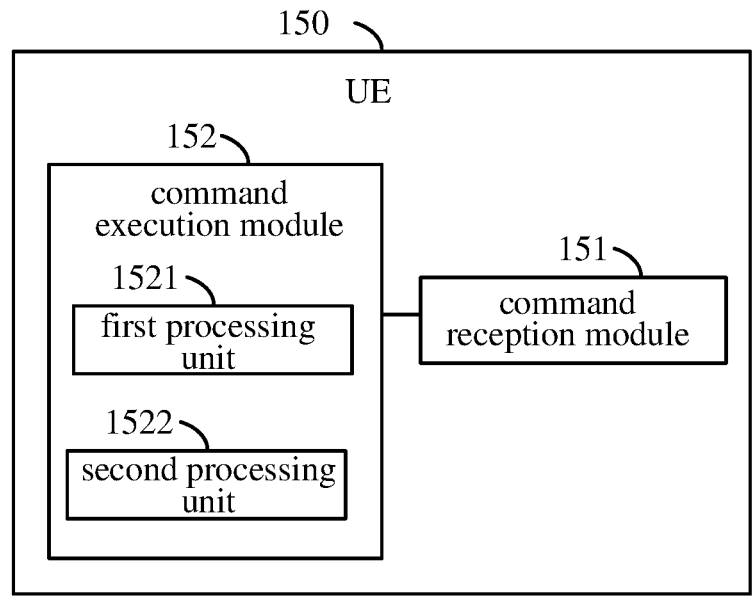
FIG. 15 is a fifth schematic view showing the UE according to some embodiments of the present disclosure.

Based on the above method, the present disclosure further provides in some embodiments a UE 150 which, as shown in FIG. 15, includes: a command reception module 151 configured to receive a deactivation command for a pre-configured first reference signal when performing a radio link monitoring operation in accordance with the pre-configured first reference signal; and a command execution module 152 configured to execute or omit the deactivation command in accordance with whether the first reference signal is allowed to be deactivated.

The command execution module 152 may include: a first processing unit 1521 configured to, when the pre-configured first reference signal is allowed to be deactivated, enable the UE to switch to perform the radio link monitoring operation on a second reference signal; and a second processing unit 1522 configured to, when the pre-configured first reference signal is not allowed to be deactivated, enable the UE to omit the deactivation command and continue to perform the radio link monitoring operation on the first reference signal.

Figure 16:
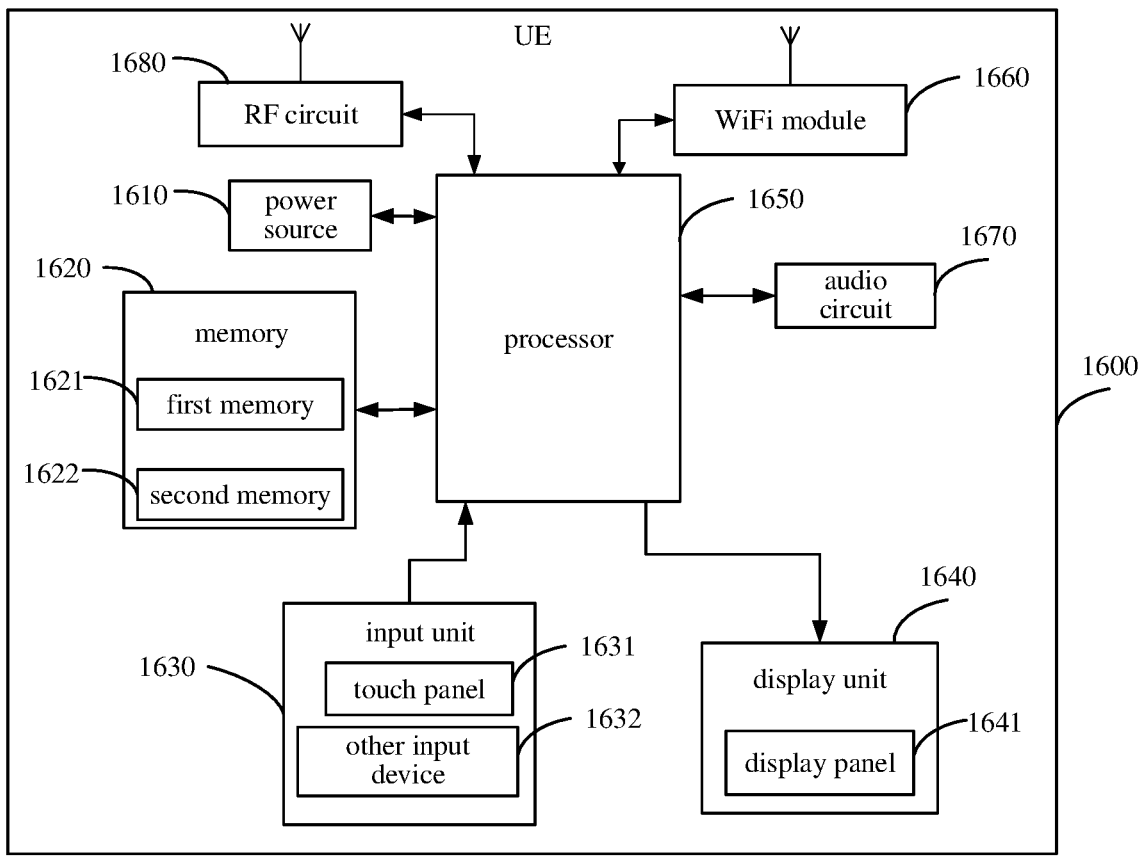
FIG. 16 is a sixth schematic view showing the UE according to some embodiments of the present disclosure.

As shown in FIG. 16, the present disclosure further provides in some embodiments a UE 1600. The UE 1600 may be a mobile phone, a flat-panel computer, a PDA or a vehicle-mounted computer.

The UE 1600 of FIG. 16 may include a power source 1610, a memory 1620, an input unit 1630, a display unit 1640, a processor 1650, a WiFi module 1660, an audio circuit 1670, and an RF circuit 1680.

The input unit 1630 is configured to receive information inputted by a user, and generate a signal input related to user settings and function control of the UE 1600. To be specific, in some embodiments of the present disclosure, the input unit 1630 may include a touch panel 1631, also called as touch screen, which is configured to collect a touch operation made by the user on or in proximity to the touch panel (e.g., an operation made by the user through any appropriate object or attachment (e.g., finger or stylus) on or in the proximity to the touch panel 1631), and drive a corresponding connection device in accordance with a predetermined program. In a possible embodiment of the present disclosure, the touch panel 1631 may include a touch detection device and a touch controller. The touch detection device is configured to detect a touch position of a user and a signal generated due to the touch operation, and transmit the signal to the touch controller. The touch controller is configured to receive touch information from the touch detection device, convert it into coordinates of a touch point, transmit the coordinates to the processor 1650, and receive and execute a command from the processor 1650. In addition, the touch panel 1631 may be of a resistive type, a capacitive type, an infrared type or a SAW type. The input unit 1630 may further include another input device 1632 which includes, but not limited to, one or more of a physical keyboard, a functional button (e.g., a volume control button or an on/off button), a trackball, a mouse, and a joystick.

The display unit 1640 is configured to display information inputted by the user or information to be presented to the user, and various menu interfaces for the UE, and it may include a display panel 1641. In a possible embodiment of the present disclosure, the display panel 1641 may be an LCD panel or an OLED panel.

It should be appreciated that, the touch panel 1631 may cover the display panel 1641, so as to form a touch display panel. When the touch operation made on or in proximity to the touch display panel has been detected, the touch information may be transmitted to the processor 1650 so as to determine a type of a touch event. Then, the processor 1650 may provide corresponding visual output on the touch display panel in accordance with the type of the touch event.

The touch display panel may include an application interface display region and a commonly-used controls display region. An arrangement mode of the two display regions will not be particularly defined herein, e.g., one of the two display regions may be arranged above or under the other, or arranged to the left or the right of the other, so as to distinguish the two display regions from each other. The application interface display region may be adopted to display interfaces for applications, and each interface may include an icon for at least one application and/or an interface element such as Widget desktop control. The application interface display region may also be a blank interface where no content is contained. The commonly-used controls display region may be adopted to display controls which are used frequently, e.g., setting button, interface number, scroll bar, or such application icons as telephone book icon.

The processor 1650 is a control center of the UE, and connected to each member of the entire UE via various interfaces and lines. The processor 1650 is configured to run or execute software programs and/or modules stored in a first memory 1621, and call data stored in a second memory 1622, so as to achieve various functions of the UE and process the data, thereby to monitor the UE. In a possible embodiment of the present disclosure, the processor 1650 may include one or more processing units.

In some embodiments of the present disclosure, the processor 1650 is configured to call the software programs and/or modules in the first memory 1621 and/or the data in the second memory 1622, so as to: receive a deactivation command for a pre-configured first reference signal when performing a radio link monitoring operation according to the pre-configured first reference signal; and execute or omit the deactivation command in accordance with whether the first reference signal is allowed to be deactivated.

To be specific, the processor 1650 is further configured to execute the computer program, so as to: when the pre-configured first reference signal is allowed to be deactivated, enable the UE switch to perform the radio link monitoring operation on a second reference signal; and when the pre-configured first reference signal is allowed to be deactivated, enable the UE to omit the deactivation command, and continue to perform the radio link monitoring operation on the first reference signal.

To be specific, the processor 1650 is further configured to execute the computer program, so as to: when the radio link monitoring operation is performed on the second reference signal, maintain or reset all of or parts of enabled counting units. The counting units may include a radio link in-sync counter, a radio link out-of-sync counter and a radio link failure timer.

Figure 17:
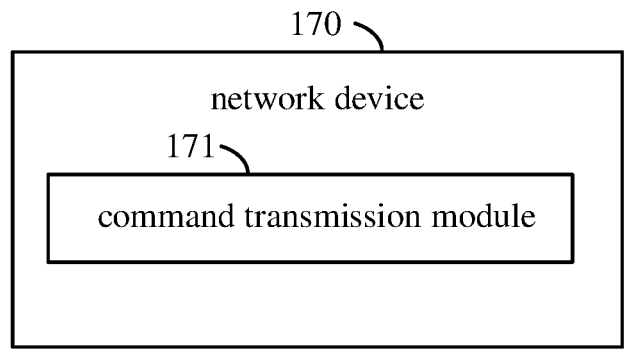
FIG. 17 is a fifth schematic view showing the network device according to some embodiments of the present disclosure.

As shown in FIG. 17, the present disclosure further provides in some embodiments a network device 170 which includes a command transmission module 171 configured to transmit a deactivation command for a first reference signal for a radio link monitoring operation to a UE.

Figure 18:
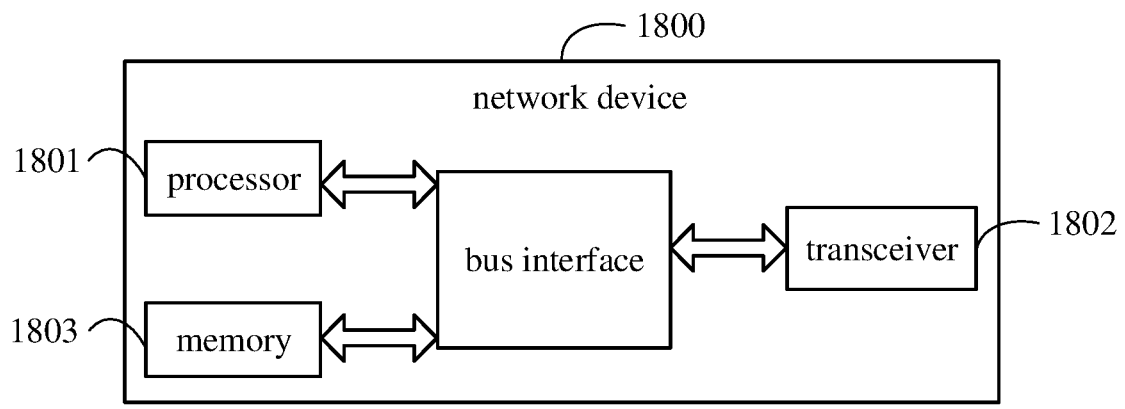
FIG. 18 is a sixth schematic view showing the network device according to some embodiments of the present disclosure.

As shown in FIG. 18, the present disclosure further provides in some embodiments a network device 1800 capable of implementing the above-mentioned radio link monitoring configuration method with a same technical effect. The network device 1800 includes a processor 1801, a transceiver 1802, a memory 1803, and a bus interface. The processor 1801 is configured to read a program in the memory 1803, so as to transmit a deactivation command for a first reference signal for a radio link monitoring operation to a UE.

In FIG. 18, bus architecture may include a number of buses and bridges connected to each other, so as to connect various circuits for one or more processors such as the processor 1801 and one or more memories such as the memory 1803. In addition, as is known in the art, the bus architecture may be used to connect various other circuits, such as a circuit for a peripheral device, a circuit for a voltage stabilizer and a power management circuit, which are not further described herein. The bus interface may be provided, and the transceiver 1802 may consist of a plurality of elements, i.e., a transmitter and a receiver for communication with various other devices over a transmission medium. The processor 1801 may take charge of managing the bus architecture as well as general processings. The memory 1803 may store therein data for the operation of the processor 1801.

The present disclosure further provides in some embodiments a UE, including a memory, a processor, and a computer program stored in the memory and executed by the processor. The processor is configured to execute the computer program so as to implement the above-mentioned radio link monitoring method for the UE with a same technical effect, which will thus not be particularly defined herein.

The present disclosure further provides in some embodiments a computer-readable storage medium storing therein a computer program. The computer program is executed by a processor so as to implement the above-mentioned radio link monitoring method for the UE with a same technical effect, which will thus not be particularly defined herein. The computer-readable storage medium may be a volatile or non-volatile computer-readable storage medium, e.g., a Read-Only Memory (ROM), a Random Access Memory (RAM), a magnetic disc or an optical disc.

The present disclosure further provides in some embodiments a network device, including a memory, a processor, and a computer program stored in the memory and executed by the processor. The processor is configured to execute the computer program so as to implement the above-mentioned radio link monitoring configuration method for the network device with a same technical effect, which will thus not be particularly defined herein.

The present disclosure further provides in some embodiments a computer-readable storage medium storing therein a computer program. The computer program is executed by a processor so as to implement the above-mentioned radio link monitoring configuration method for the network device with a same technical effect, which will thus not be particularly defined herein. The computer-readable storage medium may be a volatile or non-volatile computer-readable storage medium, e.g., an ROM, an RAM, a magnetic disc or an optical disc.

According to the radio link monitoring methods, the radio link monitoring configuration methods, the UE and the network device in the embodiments of the present disclosure, it is able to perform the radio link monitoring operation in the case that various reference signals are supported by the network device. During the monitoring procedure, the network device may reconfigure the configuration of the reference signal, e.g., reconfigure the type or the radio link monitoring parameter of the reference signal. The UE may continue to perform the radio link monitoring operation in accordance with the reconfigured reference signal or reconfigured radio link monitoring parameter.

The above embodiments have been described in a progressive manner, and the same or similar contents in the embodiments will not be repeated, i.e., each embodiment merely focuses on the difference from the others.

It should be appreciated that, some embodiments of the present disclosure may be provided as a method, a device or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or another programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the optional embodiments are described above, a person skilled in the art may make modifications and alterations to these embodiments in accordance with the basic concept of the present disclosure. So, the attached claims are intended to include the optional embodiments and all of the modifications and alterations that fall within the scope of the present disclosure.

It should be further appreciated that, such words as "first" and "second" are merely used to separate one entity or operation from another entity or operation, but are not necessarily used to represent or imply any relation or order between the entities or operations. In addition, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include other identical elements.

The above include optional embodiments of the present disclosure. It should be appreciated that, a person skilled in the art may make various modifications and improvements without departing from the principle of the present disclosure, and these modifications and improvements shall also fall within the scope of the present disclosure.

What is claimed is:

1. A radio link monitoring method for a UE, comprising:
receiving configuration information of a reference signal for a radio link monitoring operation, wherein the configuration information comprises indication information indicating two types of reference signals for the radio link monitoring operation; and
performing the radio link monitoring operation in accordance with the two types of reference signals indicated in the configuration information,
wherein the performing the radio link monitoring operation in accordance with the two types of reference signals indicated in the configuration information comprises:
setting a respective radio link in-sync counter, a respective radio link out-of-sync counter and a respective radio link failure timer with respect to each of the two types of reference signals; and
enabling the radio link in-sync counter or the radio link out-of-sync counter corresponding to each type of reference signals to perform a counting operation in accordance with a link in-sync indication or a link out-of-sync indication monitored on each type of reference signals, wherein when count values of radio link out-of-sync counters corresponding to the two types of reference signals each reach a corresponding threshold, determining that there is a radio link failure.

2. The radio link monitoring method according to claim 1, wherein the performing the radio link monitoring operation in accordance with the two types of reference signals indicated in the configuration information comprises:
when one link in-sync indication has been monitored on any type of the two types of reference signals, enabling a count value of the radio link in-sync counter to be increased by 1, and when the count value of the radio link in-sync counter reaches a first threshold, resetting or stopping time measurement of the radio link failure timer; and
when one link out-of-sync indication has been monitored on any type of the two types of reference signals, enabling the count value of the radio link out-of-sync counter to be increased by 1, and when the count value of the radio link out-of-sync counter reaches a second threshold, enabling the radio link failure timer to measure time.

3. The radio link monitoring method according to claim 1, wherein when the value of the radio link failure timer corresponding to any type of the two types of reference signals reaches the corresponding threshold, the radio link monitoring method further comprises:
reporting to a network a notification message indicating that there is the radio link failure for the reference signal corresponding to any type of the two types of reference signals.

4. A radio link monitoring method for a UE, comprising:
receiving a deactivation command for a pre-configured first reference signal when performing a radio link monitoring operation in accordance with the pre-configured first reference signal; and executing or omitting the deactivation command in accordance with a configuration parameter indicating whether the first reference signal is allowed to be deactivated, wherein the executing or omitting the deactivation command in accordance with whether the first reference signal is allowed to be deactivated comprises:

when the pre-configured first reference signal is allowed to be deactivated, enabling the UE to switch to perform the radio link monitoring operation on a second reference signal; and when the pre-configured first reference signal is not allowed to be deactivated, enabling the UE to omit the deactivation command and continue to perform the radio link monitoring operation on the first reference signal, wherein the enabling the UE to switch to perform the radio link monitoring operation on the second reference signal when the pre-configured first reference signal is allowed to be deactivated comprises:

when the UE switches to perform the radio link monitoring operation on the second reference signal, resetting all of or parts of enabled counting units, wherein the counting units comprise a radio link in-sync counter, a radio link out-of-sync counter and a radio link failure timer.

5. A UE, comprising a memory, a processor, and a computer program stored in the memory and executed by the processor, wherein the processor is configured to execute the computer program to implement the radio link monitoring method according to claim 1.

6. The UE according to claim 5, wherein the processor is further configured to execute the computer program to:

when one link in-sync indication has been monitored on any type of the two types of reference signals, enable a count value of the radio link in-sync counter to be increased by 1, and when the count value of the radio link in-sync counter reaches a first threshold, reset or stop time measurement of the radio link failure timer; and when one link out-of-sync indication has been monitored on any type of the two types of reference signals, enable the count value of the radio link out-of-sync counter to be increased by 1, and when the count value of the radio link out-of-sync counter reaches a second threshold, enable the radio link failure timer to measure time.

7. The UE according to claim 5, wherein the processor is further configured to execute the computer program to: when the value of the radio link failure timer corresponding to any type of the two types of reference signals reaches the corresponding threshold, report to a network a notification message indicating that there is the radio link failure for the reference signal corresponding to any type of the two types of reference signals.

8. A UE, comprising a memory, a processor, and a computer program stored in the memory and executed by the processor, wherein the processor is configured to execute the computer program to implement the radio link monitoring method according to claim 4.

* * * * *